US008660787B2

(12) United States Patent  
Minami

(10) Patent No.: US 8,660,787 B2  
(45) Date of Patent: Feb. 25, 2014

(54) MAP INFORMATION UPDATING SYSTEMS, METHODS, AND PROGRAMS

(75) Inventor: Toshiaki Minami, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 1133 days.

(21) Appl. No.: 12/068,640

(22) Filed: Feb. 8, 2008

(65) Prior Publication Data

US 2008/0208451 A1    Aug. 28, 2008

(30) Foreign Application Priority Data

Feb. 27, 2007  (JP) .................................. 2007-047900

(51) Int. Cl.  
*G01C 21/00*    (2006.01)

(52) U.S. Cl.  
USPC ........... 701/400; 701/420; 701/533; 701/532; 701/527; 340/995.19; 340/995.22; 340/988; 700/218; 700/228; 700/214; 700/217

(58) Field of Classification Search  
USPC ......... 701/202, 208, 209, 210, 400, 420, 532, 701/527, 533  
See application file for complete search history.

(56) References Cited

U.S. PATENT DOCUMENTS

| 5,892,463 | A  | * | 4/1999  | Hikita et al. ............. 340/995.13 |
| 6,324,467 | B1 | * | 11/2001 | Machii et al. ................. 701/420 |
| 6,970,786 | B2 | * | 11/2005 | Hayama et al. ............... 701/450 |
| 7,356,407 | B2 | * | 4/2008  | Johnson et al. ............... 701/533 |
| 2005/0027436 | A1 | * | 2/2005 | Yoshikawa et al. ........... 701/117 |
| 2005/0159889 | A1 | * | 7/2005 | Isaac .............................. 701/210 |
| 2006/0089787 | A1 | * | 4/2006 | Burr et al. ...................... 701/202 |
| 2006/0122768 | A1 | * | 6/2006 | Sumizawa et al. ............. 701/208 |
| 2006/0195256 | A1 | * | 8/2006 | Nakamura et al. ............ 701/208 |
| 2007/0198184 | A1 | * | 8/2007 | Yoshioka et al. .............. 701/211 |
| 2008/0208451 | A1 | * | 8/2008 | Minami ......................... 701/201 |

FOREIGN PATENT DOCUMENTS

| DE | 101 46 117 A1 | 4/2003 |
| EP | 0 871 010 A2 | 10/1998 |
| EP | 1 464 922 A1 | 10/2004 |
| EP | 1 493 992 A2 | 1/2005 |
| JP | A-2003-194562 | 7/2003 |
| JP | A 2005-091225 | 4/2005 |
| JP | A-2006-201125 | 8/2006 |
| JP | A-2007-010549 | 1/2007 |

OTHER PUBLICATIONS

Japanese Patent Office, Notification of Reason for Refusal mailed Dec. 28, 2010 in Japanese Patent Application No. 2007-047900 w/Partial English-language Translation.

* cited by examiner

*Primary Examiner* — Redhwan K Mawari  
(74) *Attorney, Agent, or Firm* — Oliff PLC

(57) ABSTRACT

Systems, methods, and programs store a plurality of combinations of departure points and destination points that have been set in the past, store pre-update map information, and store post-update map information. The systems, methods, and programs compare, for each of the combinations of departure points and destination points, a route retrieved using the pre-update map information and a route retrieved using the post-update map information, and transmit the comparison results to the navigation apparatus so that a user of the navigation apparatus can appreciate the benefits of updating map information.

13 Claims, 9 Drawing Sheets

FIG. 3

| DATE | DEPARTURE → DESTINATION POINT POINT | REQUIRED TIME (MIN) | TRAVEL DISTANCE (KM) | FUEL CONSUMPTION (L) |
|---|---|---|---|---|
| 01/01/2007 10:13 | A→B | 80 | 45 | 5.3 |
| 01/01/2007 18:06 | B→A | 70 | 45 | 5.0 |
| 01/02/2007 9:17 | A→C | 40 | 18 | 2.9 |
| ⋮ | ⋮ | ⋮ | ⋮ | ⋮ |

51

F I G . 5

| DATE | DEPARTURE POINT → DESTINATION POINT | POST-UPDATE MAP RETRIEVAL ||| PRE-UPDATE MAP RETRIEVAL |||
|---|---|---|---|---|---|---|---|
| | | REQUIRED TIME (MIN) | TRAVEL DISTANCE (KM) | FUEL CONSUMPTION (L) | REQUIRED TIME (MIN) | TRAVEL DISTANCE (KM) | FUEL CONSUMPTION (L) |
| 01/01/2007 10:13 | A→B | 60 | 40 | 4.8 | 80 | 45 | 5.3 |
| 01/01/2007 18:06 | B→A | 60 | 40 | 4.8 | 70 | 45 | 5.0 |
| 01/02/2007 9:17 | A→C | 30 | 15 | 2.5 | 40 | 18 | 2.9 |
| ... | ... | ... | ... | ... | ... | ... | ... |

52

MAP INFORMATION UPDATING SYSTEMS, METHODS, AND PROGRAMS

INCORPORATION BY REFERENCE

The disclosure of Japanese Patent Application No. 2007-047900, filed on Feb. 27, 2007, including the specification, drawings and abstract, is incorporated herein by reference in its entirety.

BACKGROUND

1. Related Technical Fields

Related technical fields include map information updating systems, methods, and programs.

2. Related Art

Conventionally, various map information updating systems have been proposed that notify a user about the results of comparisons of map information before and after being updated.

For example, a map information updating system is known that is structured such that the portion of the map data that is the object of updating is updated by using update information. The update information includes information for specifying the update object in the map data and update map data, which have been associated, and then stored. In the case in which the portion that has been updated by using the update map data is included in the map that is to be displayed, the display state of an updated portion and/or a non-updated portion of map data is changed so as to be visually recognizable, thereby allowing a user to visually distinguish the updated portion and the non-updated portion (refer, for example, to Japanese Published Patent Application No. JP-A-2005-91225, paragraphs [0030] to [0040] and FIG. 3).

SUMMARY

However, in the map information updating system described above, although it is easy to recognize which portion of the displayed map is the updated portion, it is not possible to recognize the benefits provided to the user as a result of the update.

Thus, various exemplary implementations of the broad principles described herein provide map information updating systems, methods, and programs that enable a user to easily recognize the benefits that are provided by updating the map information stored in a navigation system.

Various exemplary implementations provide systems, methods, and programs that may store a plurality of combinations of departure points and destination points that have been set in the past, may store pre-update map information, and may store post-update map information. The systems, methods, and programs may compare, for each of the combinations of departure points and destination points, a route retrieved using the pre-update map information and a route retrieved using the post-update map information, and may transmit the comparison results to the navigation apparatus.

BRIEF DESCRIPTION OF THE DRAWINGS

Exemplary implementations will now be described with reference to the accompanying drawings, wherein:

FIG. 3 is a diagram that shows an example of a travel history data table;

FIG. 5 is a diagram that shows an example of a travel information comparison table;

DETAILED DESCRIPTION OF EXEMPLARY IMPLEMENTATIONS

Figure 1:
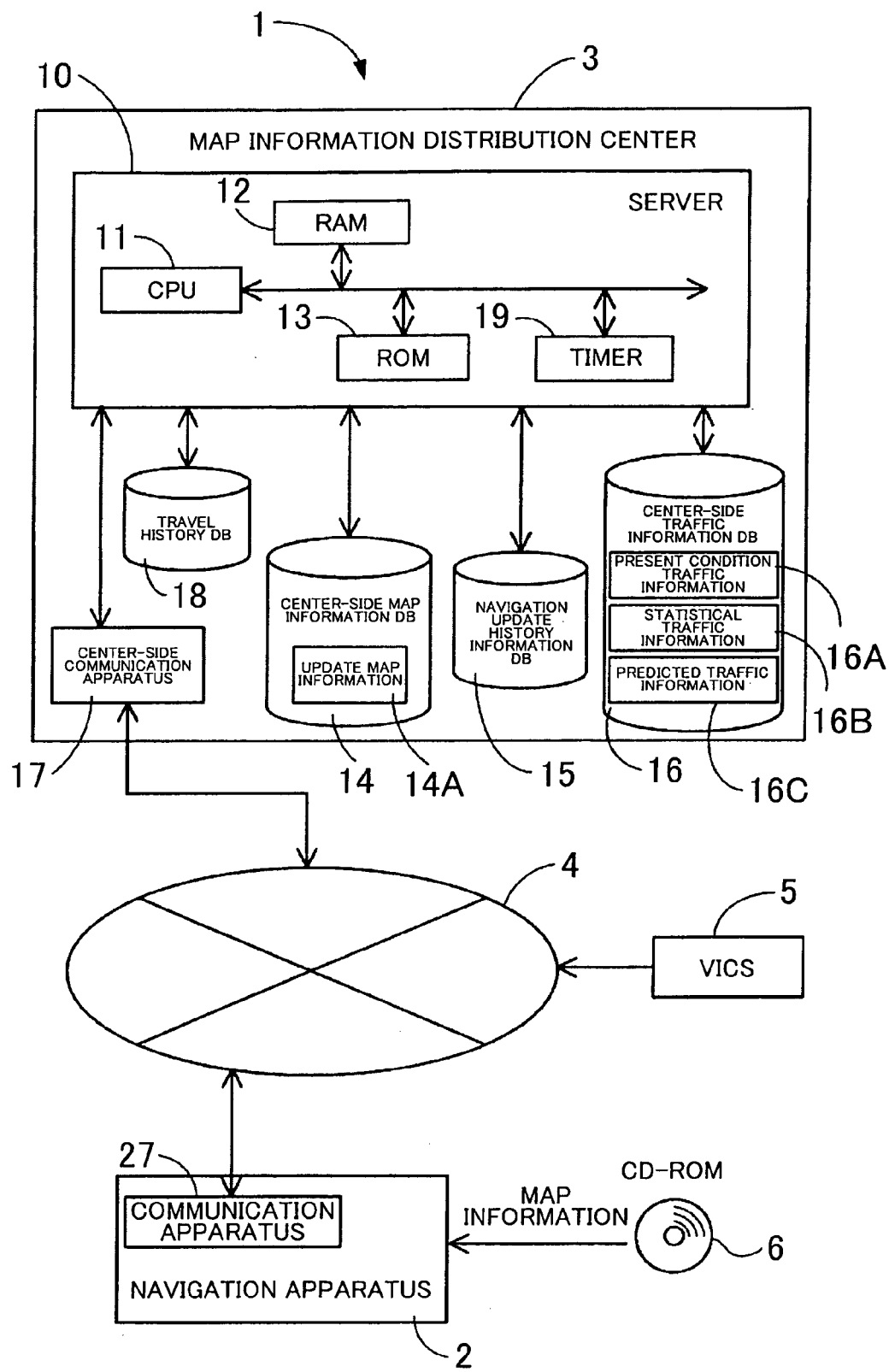
FIG. 1 is a block diagram that shows an exemplary navigation system.

An exemplary map information updating system will be explained with reference to FIGS. 1-6 that may be used in conjunction with a navigation system. FIG. 1 is a block diagram that shows an exemplary navigation system 1.

As shown in FIG. 1, the navigation system 1 may include a navigation apparatus 2, a map information distribution center 3, and a network 4. The map information distribution center 3 may provide a notification to the navigation apparatus 2 about update information for updating the map information including the benefits that can be obtained by updating the map information. This notification may be provided before updating the navigation map information 37A (refer to FIG. 3), which will be described later. In addition, the navigation apparatus 2 and the map information distribution center 3 may be structured so as to enable transmission and reception of various information via the network 4. An example of the structure of the navigation apparatus 2 will be explained later in detail with reference to FIG. 2.

In addition, a Vehicle Information and Communication System (VICS®) 5 may be connected to the network 4. The navigation apparatus 2 and the map information distribution center 3 may be structured such that information related to traffic congestion on roads and traffic information, such as traffic regulation information and the like produced by collecting information from the traffic control systems of the Japan Highway Public Corporation, can be received at predetermined time intervals via the network 4. In addition, the traffic information may include detailed information related to, for example, road congestion information and traffic regulation information related to road construction, building construction, and the like. In the case of road congestion information, the detailed traffic information may include a VICS link ID, an actual length of traffic congestion, a required time to travel through the congestion, a degree of the traffic congestion (e.g., "no traffic congestion," "crowded," or "congested"), a vehicle speed in the traffic congestion, a travel time, a direction of the congested traffic lane, and/or a time at which the traffic congestion is expected to clear. In the case of traffic regulation information, the detailed traffic information may include the VICS link ID, road construction information, a construction work period, road closures, whether traffic is only on one side of the road, types of traffic regulations such as lane regulations, and/or the timeframe of the traffic regulations and the like.

As shown in FIG. 1, the map information distribution center 3 may be provided with a server 10, a center-side map information database (DB) 14 that records map information and is connected to the server 10, a navigation update history DB 15, a center-side traffic information DB 16, a center-side communication apparatus 17, and a travel history DB 18.

The server 10 may include a controller (CPU 11) that serves as an arithmetic apparatus and a control apparatus that carries out the overall control of the server 10, and a RAM 12 that may be used as the working memory when the CPU 11 carries out various types of arithmetic processing. Alternatively, an MPU or the like may be used instead of the CPU 11. In addition, the server 10 may be provided with an internal storage unit and a timer 19 that calculates the time. The internal storage unit, such as a ROM 13, may store various control programs for carrying out map information updating processing and update information notification processing (e.g., according to the method of FIG. 4). In the map information processing, update information (such as differential data representing a difference between the updated map data and the map data to be updated) for updating the map information of a predetermined area to a new version of the map information based on a request from the navigation apparatus 2 may be extracted from the center-side map information DB 14 and distributed to the navigation apparatus 2. In the update information notification processing, the navigation apparatus 2 may be notified about the benefits and the like that can be obtained by updating the navigation map information 37A.

Update map information 14A that serves as a basis for updating the map information stored in the navigation apparatus 2 may be produced by the map information distribution center 3. The update map information 14A may be categorized according to version and stored in the center-side map information DB 14. Furthermore, the update information that is for updating a portion or all of the map information that is currently stored in the navigation apparatus 2 to the update map information 14A, may also be stored in the center-side map information DB. Here, the term "version" denotes, for example, the production time information for specifying the period during which the map information was produced. Accordingly, it is possible to specify the period during which the map information was produced by referring to the version.

Various types of information that are necessary for carrying out route guidance and map display by the navigation apparatus 2 are recorded in the update map information 14A in the center-side map information DB 14. This update map information 14A may include, for example, map display data for displaying the maps, intersection data that is related to intersections, node data that is related to nodes, link data related to roads (links), which are a type of facility, retrieval data for retrieving routes, facility data that is related to POI (Points of Interest) such as stores, which are a type of facility, and retrieval data for retrieving cites.

Here, in particular, map display data may be configured by units that are divided into quarters (length ½), sixteenths (¼), or sixty-fourths (⅛) based on a two-dimensional mesh that is partitioned into approximately 10 km×10 km units, and the unit for each area may be set such that the data amounts for each unit are substantially at an identical levels. The smallest units, which have the $64^{th}$-partition size, are about 1.25 square kilometers.

In addition, there are three distribution road segments: high rank road segments that may include national expressways, urban highways, automobile-only roads, general toll roads, and/or major national roads; general road segments that may include general national roads, main regional roads, prefectural roads, and town and/or village roads; and narrow street segments that include narrow streets. Each of these segments may be stored in and managed by the update map information 14A according to their respective versions.

As discussed, when a request for update information has been received from the navigation apparatus 2, the map information distribution center 3 may provide a notification about the benefits that can be obtained by updating the navigation map information 37A. In addition, when there has been a distribution request for map information from the navigation apparatus 2, the map information distribution center 3 may update the map information stored in the navigation apparatus 2 by using the newest version of the update map information 14A within update map information 14A in the center-side map information DB 14.

Specifically, when there has been a distribution request for update map information 14A from the navigation apparatus 2, the update may be carried out by distributing to the navigation apparatus 2 the differential data for updating to the newest version of the update map information 14A. Here, all information that includes new road information for specifying the new roads of the newest version of the update map information 14A may be transmitted as difference data that is distributed to the navigation apparatus 2, or the necessary minimum information (only information for the updated portions that include the new road information for specifying new roads) for updating from the present map information that is stored in the navigation apparatus 2 to the newest version of the update map data 14A may be transmitted to the navigation apparatus 2.

In contrast, in the navigation update history information DB 15, information that relates to the update history of the updates that have already been carried out in each navigation apparatus 2 is stored along with a navigation apparatus identification ID that specifies each navigation apparatus 2. As map history, a version of the map information used for each of the three distribution road segments (i.e., the high rank road segment, the general road segment, and the narrow street segment) is stored in the link data and the node data that form the map information, and the update history is overwritten by new update history each time the update of the map information of the navigation apparatus 2 is carried out.

Present condition traffic information 16A may be contained in the center-side traffic information DB 16. The present condition traffic information 16A may be information that relates to present traffic congestion on roads and the like, and is produced by collecting the traffic information that has been received from the VICS 5.

Statistical traffic information 16B, generated based on past traffic information that has been received from the VICS 6, may be contained in this center-side traffic information DB 16. Note that this statistical traffic information 16B may include information about scheduled events such as scheduled event venues and dates for festivals, parades, and/or fireworks, and the like. Further, the statistical traffic information 16B may include statistical traffic congestion information and predicted traffic congestion information about whether traffic congestion will occur at a specified time every day, excluding weekends, on roads in the vicinity of train stations and large-scale commercial facilities, and whether traffic congestion will occur during summer holiday periods on roads in the vicinity of a swimming beach.

Predicted traffic information 16C may be contained in the center-side traffic information DB 16. This predicted traffic information 16C may be traffic congestion information predicted for each road or each link at predetermined intervals in the future (for example, for approximately 15-minute intervals, approximately 30-minute intervals, and approximately one-hour intervals from the present time) from the position of the vehicle based on the present condition traffic information 16A and the statistical traffic information 16B.

When there is a request from the navigation apparatus 2, the map information distribution center 3 may select and distribute traffic information between intersections, statistical traffic information 16B, and predicted traffic information 16C based on the present condition traffic information 16A that is contained in the center-side traffic information DB 16.

Requests for update information that have been received from the navigation apparatus 2, the travel history data (e.g., FIG. 3), and a navigation apparatus identification ID that have been received from the navigation apparatus 2, are stored in the travel history DB 18.

It is possible to use, for example, a LAN (Local Area Network), a WAN (Wide Area Network), an intranet, or a communication circuit network such as a mobile telephone circuit network, a telephone circuit network, a public communication circuit network, a dedicated communication circuit network, the Internet, or the like, as the network 4. In addition, it is possible to use a communication system that uses CS broadcasting by using a broadcast satellite, BS broadcasting, terrestrial digital television broadcasting, or FM multiplex broadcasting, or the like. Furthermore, it is possible to use a communication system such as the non-stop automatic fee payment system (ETC) that is used in an intelligent transport system (ITS) or dedicated short-range communication (DSRC).

In addition, as shown in FIG. 1, when a CD-ROM 6, on which a prescribed version of map information having a prefecture unit or the like, is inserted into a reading unit 28, the navigation apparatus 2 reads the prescribed version of map information, and is able to update the navigation map information 37A. Note that an electromagnetic disk such as a flexible disk, a memory card, an electromagnetic tape, an electromagnetic drum, MD, DVD, MO, IC card, optical card, or the like may be used instead of the CD-ROM 6, provided that the medium can be read by the reading unit 28 of the navigation apparatus 2.

Figure 2:
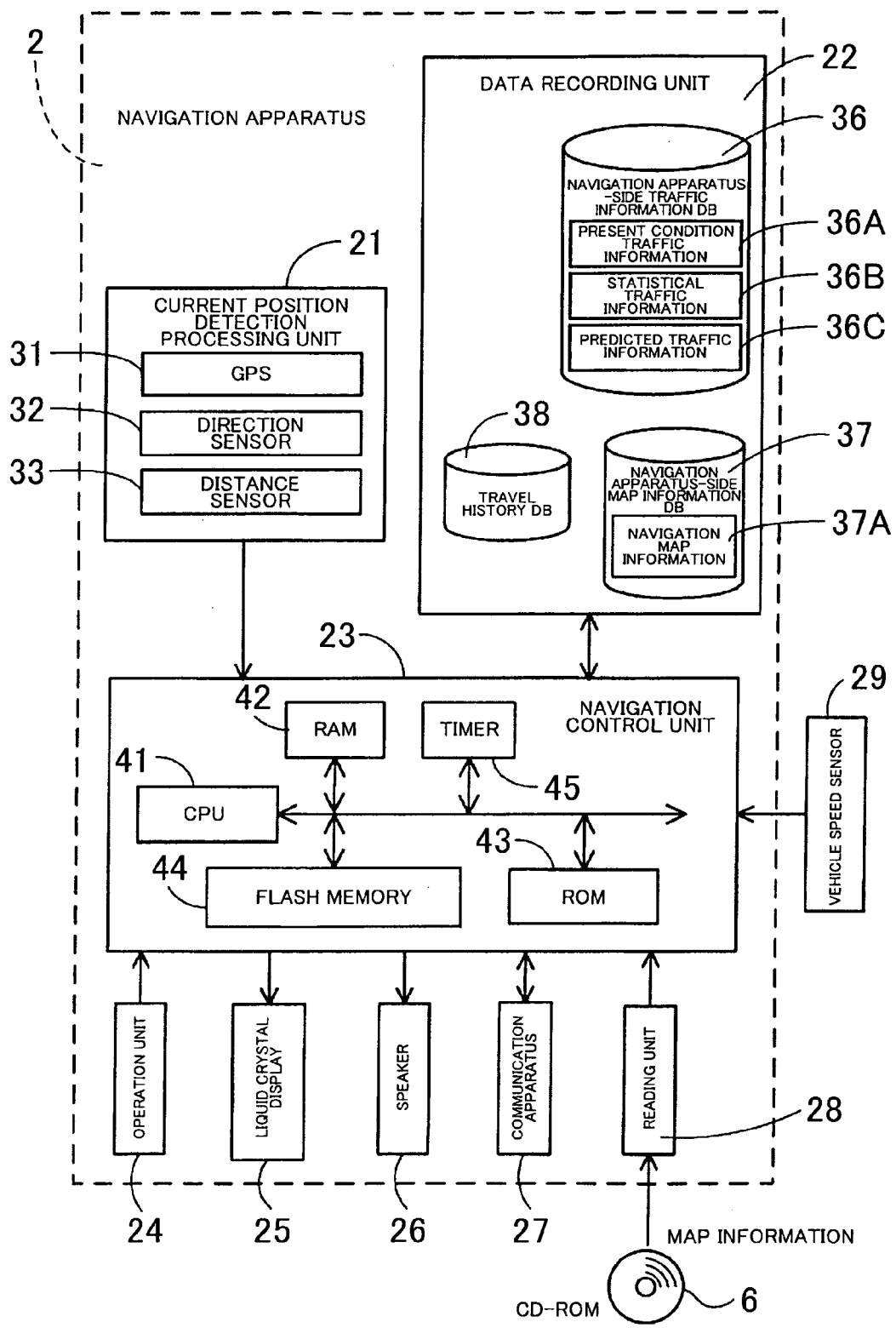
FIG. 2 is a block diagram that shows an exemplary navigation apparatus.

Next, the schematic structure of an exemplary navigation apparatus 2 that may be included in the navigation system I will be explained with reference to FIG. 2. As shown in FIG. 2, the navigation apparatus 2 may include a current position detection processing unit 21 that detects the current position of the vehicle, a data recording unit 22, a navigation control unit 23 that carries out various types of arithmetic processing based on input information, an operating unit 24 that accepts operations from an operator, a liquid crystal display 25 that displays information for the maps and the like to the operator, a speaker 26 that outputs audio guidance related to the route guidance, a communication apparatus 27 that carries out communication via a mobile telephone network and the like between the VICS 5 and the map information distribution center 3 and the like, and the reading unit 28 that reads a prescribed version of the map information that is recorded at the prefecture unit or the like from the CD-ROM 6, which serves as a recording medium. In addition, a vehicle speed sensor 29 that detects the traveling speed of the vehicle may be connected to the navigation control unit 23.

Hereinafter, each of the structural elements that form the navigation apparatus 2 will be explained. The current position detection processing unit 21 may include, for example, a GPS 31, a direction sensor 32, a distance sensor 33, an altimeter (not illustrated), and/or the like, and can detect the current position of the vehicle, the direction, the distance to a landmark (for example, an intersection), and the like.

Specifically, the GPS 31 may detect the current location of the vehicle on the earth and the current time by receiving radio waves that have been generated by satellites. The direction sensor 32 may be structured by a geomagnetic sensor, a gyroscopic sensor, and/or an optical rotation sensor that is attached to the rotating portion of the steering wheel (not illustrated), a rotation resistance sensor, an angle sensor that is attached to the wheels, and/or the like, and the direction sensor 32 detects the direction of the vehicle. In addition, the distance sensor 33 may be structured, for example, by a sensor that measures the rotation speed of the wheels (not illustrated) of the vehicle and detects the distance based on the measured rotation speed, and/or a sensor that measures the acceleration and detects the distance by doubly integrating the measured acceleration. The distance sensor 33 detects the moving distance of the vehicle.

The data recording unit 22 may be provided with a hard disk (not illustrated) that serves as an external memory apparatus and a storage medium, a navigation apparatus-side traffic information database DB 36, a navigation apparatus-side map information database DB 37, a travel history database DB 38. Note that it is also possible to use an electromagnetic disk such as a flexible disk, a memory card, an electromagnetic tape, an electromagnetic drum, a CD, an MS, a DVD, an optical disk, an MO, an IC card, an optical card, and/or the like as the external storage apparatus.

Here, the present condition traffic information 36A may be contained in the navigation apparatus-side traffic information DB 36. The present condition traffic information 36A may be produced from traffic information that includes, for example, road congestion information (described above) and traffic regulation information (described above), which are received from the map information distribution center 3 and the VICS 5. In addition, the data that is contained in the statistical traffic information 16B (described above), which is distributed from the map information distribution center 3 via the communication apparatus 27, may be stored in the statistical traffic information 36B. In addition, the contents of the statistical traffic information 36B may be updated by downloading update information for each set of data that is contained in the statistical traffic information 16B, which is distributed from the map information distribution center 3 via the communication apparatus 27.

The navigation apparatus 2 may be structured such that the sets of data, which are provided by a CD-ROM or the like and contained in the statistical traffic information 16B, are stored in the statistical traffic information 36B, and are updated based on the travel history at predetermined time intervals (for example, every one week to three months).

The statistical traffic information 36B may include scheduled event information (described above), and the like. The statistical traffic information 36B may also include statistical traffic congestion information (described above) and predicted traffic congestion information (described above).

Furthermore, sets of data that are distributed from the map information distribution center 3 via the communication apparatus 27 and contained in the predicted traffic information 16C may be stored in the navigation apparatus-side traffic information DB 36. In addition, the contents of the predicted traffic information 36C may be updated by downloading the update information for each set of data that is contained in the predicted traffic information 16C that has been distributed from the map information distribution center 3 via the communication apparatus 27.

The navigation apparatus 2 may be structured such that sets of data, which are provided by a CD-ROM or the like and are contained in the predicted traffic information 16C, are stored in the predicted traffic information 36C, and the sets of data are updated at predetermined time intervals (for example, one week to three months) based on the present condition traffic information 36A and the statistical traffic information 36B.

In addition, the navigation map information 37A, which may be used in the travel guidance and route searches of the navigation apparatus 2 and is the object of updating by the map information distribution center 3, may be contained in the navigation apparatus-side map information DB 37. Here, similar to the update map information 14A, the navigation map information 37A is formed by various types of information that are necessary for route guidance and map display, such as, for example, new road information for specifying new roads, map display data for displaying maps, intersection data related to intersections, node data related to nodes, link data related to roads (links), which are a type of facility, retrieval data for retrieving routes, store data related to POI, such as stores, which are a type of facility, and retrieval data for retrieving locations.

In addition, the content of the navigation apparatus-side map information DB 37 may be updated by downloading differential data that is distributed from the map information distribution center 3 via the communication apparatus 27. The content of the navigation apparatus-side map information DB 37 may be updated by reading, via the reading unit 28, a prescribed version of map information that is recorded on a CD-ROM 6 inserted in the reading unit 28.

A travel history data table 51 (e.g., FIG. 3) may be contained in the travel history DB 38 and may store information related to the travel history for departure points and destination points and the like that are related to routes that have been traveled in the past.

As shown in FIG. 2, the navigation control unit 23 may be provided, for example, with a controller (e.g., CPU 41) that serves as an arithmetic apparatus and a control apparatus, which carries out overall control of the navigation apparatus 2; a RAM 42 that may be used as the working memory when the CPU 41 is carrying out various types of arithmetic processing and that may store route data when retrieving routes and traffic information from the map information distribution center 3; a ROM 43 that may store, in addition to control programs, an update information notification processing program (e.g., FIG. 4); a flash memory 44 that may store the programs that are read from the ROM 43; and/or a timer 45 that measures time. Note that a semiconductor memory, an electromagnetic core and/or the like may be used as the RAM 42, the ROM 43, and/or the flash memory 44. In addition, instead of the CPU 41, an MPU or the like can be used as the arithmetic apparatus and the control apparatus.

Different types of programs may be stored in the ROM 43, and various types of data may be stored in the data recording unit 22. However, it is possible to read programs, data, and the like from the same external storage apparatus or a memory card or the like, and write them to the flash memory 44. Furthermore, it is possible to update the programs, data, and the like by exchanging the memory cards or the like.

Peripheral apparatuses (actuators) of the operating unit 24, the liquid crystal display 25, the speaker 26, the communication apparatus 27, and the reading unit 28 may be electrically connected to the navigation control unit 23.

This operating unit 24 may be operated, for example, in the cases in which the current position at the start of travel is corrected, the departure point, which serves as the guidance starting point, and the destination point, which serves as the guidance ending point, are input, information related to facilities is retrieved, and is structured by different types of keys and a plurality of operating switches. In addition, based on switching signals that are output, for example, by pressing down the switches, the navigation control unit 23 may carry out control in which different types of corresponding actions are executed. Furthermore, a touch panel may be provided on the front surface of the liquid crystal display 25 to input different types of directing commands by pressing buttons that are displayed on the screen. Note that it is possible to use a keyboard, a mouse, a barcode reader, a remote control apparatus that is used for remote control, a joystick, a light pen, a stylus pen or the like, as the operation unit 24.

On the liquid crystal display 25, operating guidance, operating menus, key guidance, recommended routes from the present position to the destination point, guidance information along the recommended route, traffic information, news, weather reports, the time, mail, television programs, a route guidance screen that displays maps based on the navigation map information 37A, traffic information for each link, and/or the like may be displayed.

The speaker 26 may output, for example, audio guidance that guides the travel along the recommended route based on instructions from the navigation control unit 23. Here, for example, phrases such as "200 meters ahead, turn right at xx intersection" or "please press the newest function merit button" are examples of the audio guidance. The reading unit 28 may read a prescribed version of the map information that is recorded on the inserted CD-ROM 6.

The communication apparatus 27 may carry out communication with the map information distribution center 3 by using, for example, a mobile telephone network. The communication apparatus 27 may carry out the transmission and reception of the newest version of the update map information and the present condition traffic information and the like with the map information distribution center 3. In addition to the map information distribution center 3, the communication apparatus 27 may receive traffic information that is formed by various types of information, such as the traffic congestion information, regulation information, parking lot information, traffic accident information, crowded conditions at service areas, and/or the like, which are transmitted from the VICS 5.

Here, the travel history data table 51 in the travel history DB 38 of the navigation apparatus 2 will be explained with reference to FIG. 3. As shown in FIG. 3, the travel history data table 51 may include a "date" field that shows the year, month, day, and the travel start time that the travel occurred, a "departure point→destination point" field that shows the departure point and the destination point of the route that was traveled, the a "required time (min)" field that shows the required time for the route that was traveled, a "travel distance (km)" field that shows the travel distance of the route that was traveled, and the a "fuel consumption (l)" filed that shows the amount of the fuel that has been consumed on the route that was traveled.

Note that the travel distance of the route that was traveled can be calculated by reading the distance of each link that has been traveled from the navigation map information 37A, and totaling the distances. In addition, data for the average fuel consumption (km/l) may be stored in advance on the data recording unit 22, the ROM 43, and the flash memory 44 for each road type that is included in the three road type segments. For example, the average fuel consumption when traveling along road in the high rank road segment of 10 (km/l) and the average fuel consumption when traveling along a road in the general road segment of 6 (km/l) are contained in advance in the data recording unit 22, the ROM 43, and the flash memory 44. Therefore, the CPU 41 may total the distances of each of the traveled links for each road type, divide the results by the average fuel consumption for the road type corresponding to each of the totaled distances, and total the results. Thus, it is possible to calculate the fuel consumption (l) of the route that has been traveled from the departure point to the destination point. Furthermore, the CPU 41 may divide the fuel consumption (l) of the traveled route from the departure point to the destination point by the total travel distance (km) of the route, and thereby it is also possible to calculate the average fuel consumption (km/l) of the entire route.

Next, an exemplary benefit notification method will be described with reference to FIG. 4. The exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

For example, a programs implementing the method may be stored in the ROM 43 of the navigation apparatus 2 and the ROM 13 of the map information distribution center 3 and executed by the CPU 41 of the navigation apparatus 2 and the CPU 11 of the map information distribution center 3 (e.g., at predetermined time intervals of approximately every 10 milliseconds to every 100 seconds) to provide notification of the benefits that can be obtained by updating the navigation map information 37A of the navigation apparatus-side map information DB 37.

Figure 4:
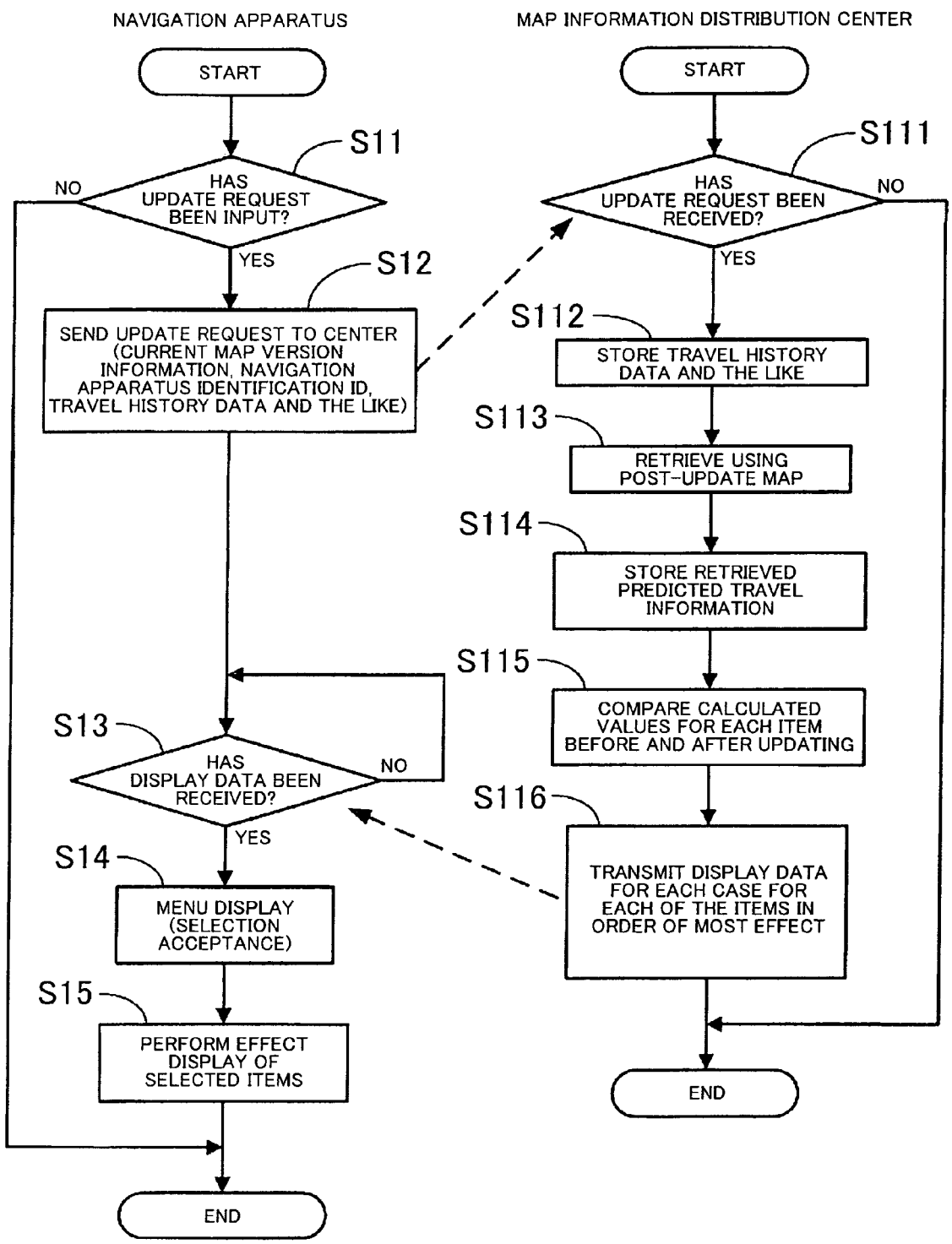
FIG. 4 is a flowchart that shows an exemplary benefit notification method.

As shown in FIG. 4, first, in step (below, abbreviated as "S") 11, the CPU 41 of the navigation apparatus 2 executes determination processing in which it is determined whether an update request instruction that directs the updating of the navigation map information 37A has been input via the operating unit 24. If the update request instruction has not been input via the operation unit 24 (S11: NO), the CPU 41 ends this processing.

If the update request instruction has been input via the operation unit 24 (S11: YES), the CPU 41 transmits a request command, which requests the updating of the navigation map information 37A, to the map information distribution center 3 (S12). In addition, simultaneously to the request command, the CPU 41 transmits to the map information distribution center 3 via the communication apparatus 27 the navigation apparatus identification ID that identifies the navigation apparatus 2, the version of the current map information that is contained in the navigation map information 37A, the travel history data contained in the travel history data table 51 (e.g., FIG. 3) stored in the travel history DB 38. Note that the CPU 41 may only transmit sets of the travel history data from 3 to 6 months ago, which are stored in the travel history data table 51 to the present.

At the same time, as shown in FIG. 4, the CPU 11 of the map information distribution center 3 may determine whether the request command has been received from the navigation apparatus 2 via the center-side communication apparatus 17 (S111). If the request command has not been received (S111: NO), the CPU 11 ends this processing.

If the request command, which requests the updating of the navigation map information 37A, has been received (S111: YES), the CPU 11 stores, for example, the navigation apparatus identification ID that is retrieved via the center-side communication apparatus simultaneously with the request command, the version of the current map information that is contained in the navigation map information 37A, and the travel history data in the travel history DB 18 (S112).

Next, in S113, the CPU 11 reads in sequence the "date" and the "departure point→destination point" in the travel history data that has been received from the travel history DB 18. Thereafter, based on the newest version of the map information that is contained in the update map information 14A, the present condition traffic information 16A, and the statistical traffic information 16B, the CPU 11 retrieves routes that correspond to the "departure point→destination point," which is based on the weekday of the "date," season, and departure time. Then, the CPU 11 stores the route information related to each of these retrieved routes in the RAM 12.

In S114, the CPU 11 calculates the "required time (min)," the "travel distance (km)," and the "fuel consumption (l)" for each route based on the route information related to each of these retrieved routes, and stores the results as predicted travel information in the RAM 12. Subsequently, the CPU 11 produces the travel information comparison table 52 (refer to FIG. 5) based on the travel history data of the navigation apparatus 2 that is stored in the travel history DB 18, and the predicted travel information that is stored in the RAM 12, and stores this travel information comparison table 52 in the travel history DB 18.

Thus, the CPU 11 can compare each of the "required time (min)," the "travel distance (km)," and the "fuel consumption (l)" entries for each of the routes before updating the navigation map information 37A and after updating the navigation map information 37A that correspond to the "date" and the "departure point→destination point," based on the travel information comparison table 52.

An example of the travel information comparison table 52 that may be contained in the travel history DB 18 will be explained with reference to FIG. 5. As shown in FIG. 5, the travel information comparison table 52 includes a "date" field that shows the year, month, day, and the travel start time that traveling occurred, a "departure point→destination point" field that shows the departure point and the destination point, which were included in the received travel history data and are labeled the "pre-update map retrieval." The travel information comparison table 52 also includes "post-update map retrieval" data that shows the "required time (min)," the "travel distance (km)," the "fuel consumption (l)" for each of the routes that have been retrieved based on the newest version of the map information contained in the update map information 14A, the present condition traffic information 16A, and the statistical traffic information 16B and the like.

Note that the "travel distance (km)" in the "post-update map retrieval" of the travel information comparison table 52 can be calculated by reading the distance of each of the links of the roads that have been retrieved from the newest version of the map information that is contained in the update map information 14A, and totaling the results. In addition, the data for the average fuel consumption (km/l) is contained in advance in the travel history DB 18 and the ROM 13 and the like for each of the road types that are included in the three segments (in the manner discussed above). Therefore, for the "fuel consumption (l)" of the "post-update map retrieval" of the travel information comparison table 52, the fuel consumption (l) of the routes that have been traveled from the departure point to the destination point can be calculated by totaling the distances of each of the links of each of the roads that have been retrieved for each road type and dividing the results by the average consumption for each of the road types that correspond to each of the totaled distances and then totaling the results. Furthermore, the CPU 11 can calculate the average fuel consumption (km/l) in the manner discussed above.

Next, in S115, the CPU 11 compares the "post-update map retrieval" and the "pre-update map retrieval" of the travel information comparison table 52 for each of the "required time (min)," the "travel distance (km)," and the "fuel consumption (l)" entries based on the travel information comparison table 52 that is contained in the travel history DB 18. In addition, the CPU 11 selects several cases (for example, from three to five cases) for each of the entries starting from the best cases (i.e., having the most improved effect), and stores the results in the RAM 12.

For example, for the "required time (min)" of the "post-update map retrieval" and the "pre-update map retrieval" of the travel information comparison table 52, in the case in which the "date" is 2007/XX/YY/ZZ:ZZ and the "departure point→destination point" is "C→D," the CPU 11 stores "reduced by 30 minutes" in the RAM 12 as the case in which the time is reduced by the greatest amount. In addition, for the case in which the "date" is 2007/1/1/10:13 and the "departure point→destination point" is "A→B," the CPU 11 stores "reduced by 20 minutes" in the RAM 12 as the case in which the time is reduced by the second greatest amount. Furthermore, for the case in which the "date" is 2007/XX/YY/ZZ:ZZ and the "departure point→destination point" is "A→F," the CPU 11 stores "reduced by 15 minutes" in the RAM 12 as the case in which the time is reduced by the third greatest amount.

In addition, in S116, the CPU produces display data that shows improved values (for example, a "30 minute reduction" for "C→D," a "20 minute reduction" for "A→B," a "20 km reduction" for "A→B," a "15 km reduction" for "E→F," a "2.0 liter reduction" for "A→B," and a "1.1 liter reduction" for "E→F") that have been selected for each of the cases starting from the best cases in order of the most improved effect for each of the "required time (min)," the "travel distance (km)," and the "fuel consumption (l)" entries, and stores the results in the RAM 12. Subsequently, the CPU 11 reads the navigation apparatus identification ID that corresponds to the travel history data that has been received from the travel history DB 18, reads and transmits this "display data" from the RAM 12 to the navigation apparatus 2 that corresponds to this navigation apparatus identification ID, and at the same time, ends this processing after transmitting the newest version of the version information of the update map information 14A.

Meanwhile, in S13, the CPU 14 of the navigation apparatus 2 waits to receive the "display data" that shows the improved content for each of the "required time (min)," the "travel distance (km)," and the "fuel consumption (l)" entries from the map information distribution center 3 via the communication system 27.

In addition, in the case in which the "display data" and the "fuel consumption (l)" entries from the map information distribution center 3 have been received (S13: YES), the CPU 41 proceeds to the processing of S14.

In S14, the CPU 14 stores in the RAM 42 the "display data" and the "fuel consumption (l)" entries that have been received. In addition, the newest version of the version information of the update map information 14A that has been received simultaneously with this "display data" is stored in the RAM 42. In addition, the CPU 41 displays on the liquid crystal display 25 the menu display (selection acceptance) that accepts the display of the improved content in the case in which the navigation map information 37A has been updated to the newest version of the map information.

In S15, when an entry is selected from the menu display that has been displayed on the liquid crystal display 25 via the operation unit 24, the CPU 41 reads the display data that corresponds to this entry from the "display data" that shows the improved content for each of the entries that has been stored in the RAM 42 in S114, described above, and after displaying this on the liquid crystal display 25, ends this processing. In contrast, in the case in which a suspension of the menu display has been directed via the operation unit 24, the CPU 41 ends this processing.

Figure 6:
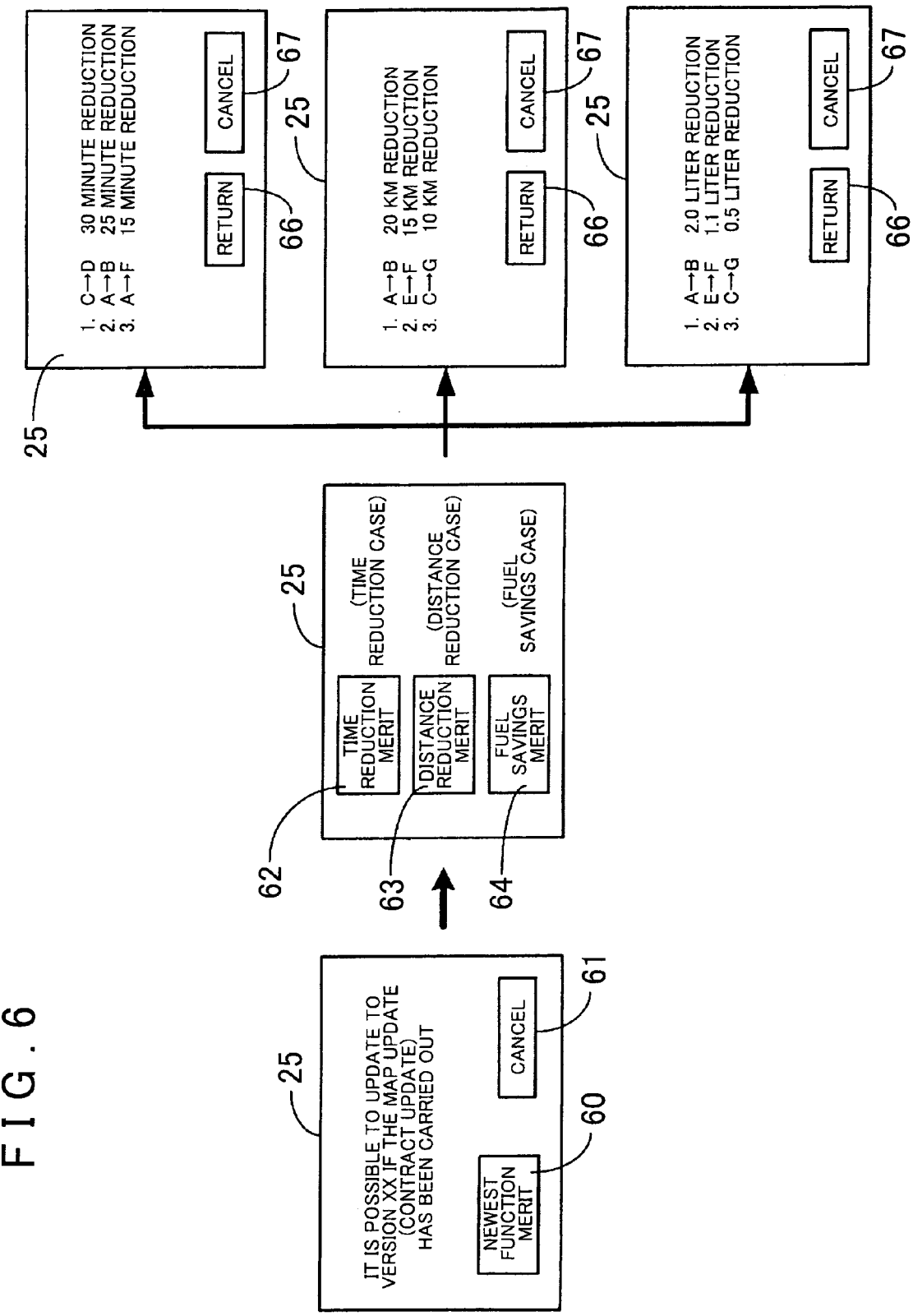
FIG. 6 is a diagram that shows examples of a menu display and an effect display.

An example of the menu display (selection acceptance) that the CPU 41 displays on the liquid crystal display 25 and the effect display of the selected entry will be explained with reference to FIG. 6. As shown in FIG. 6, first, the CPU 41 reads the newest version of the version information (for example, the newest version is "version xx") of the update map information 14A from the RAM 42, and displays "it is possible to update to version xx if the map update (contract update) has been carried out" on the liquid crystal display 25. In addition, in the case in which the navigation map information 37A has been updated to the newest version of the map information, the CPU 41 displays a "newest function merit" button 60 that directs the display of the improved content (e.g., on the left side of the lower edge portion of the liquid crystal display 25). In addition, the CPU 41 displays (e.g., on the right side of the "newest function merit" button 60) a "cancel" button 61 that directs canceling of the display of the content that has been improved in the case in which the navigation map information 37A has been updated.

If the "newest function merit" button 60 has been pressed via the touch panel or the operation button, the CPU 41 displays on the liquid crystal display 25 a "time reduction merit" button 62 that directs the display of the improved content of the "required time (min)" entry, a "distance reduction merit" button 63 that directs the display of the "display data" that shows the improved content of the "travel distance (km)" entry, and a "fuel saving merit" button 64 that directs the display of the "display data" that shows the improved content of the entry for "fuel consumption (l)." In addition, the CPU 41 displays "time reduction case" on in conjunction with the "time reduction merit" button 62, displays "distance reduction case" in conjunction with the "distance reduction merit" button 63, and displays "fuel savings case" in conjunction with the "fuel savings merit" button 64.

Note that in the case in which the "cancel" button 61 has been pressed via the touch panel or the operation button, the CPU 41 cancels the display of the content that has been improved in the case in which the navigation map information 37A has been updated.

Next, if the "time reduction merit" button 62 has been pressed via the touch panel or the operation button, the CPU 41 reads the "display data" that shows the improved content of the "necessary time (min)" entry from the RAM 42, and displays the result on the liquid crystal display 25. Thus, among the routes that have been traveled in the past, three cases are displayed starting from the best cases in order of the most distance reduction effect that has been obtained by updating the navigation map information 37A.

If the case in which the "distance reduction merit" button 63 has been pressed via the touch panel or the operation button, the CPU 41 reads the "display data" that shows the improved content of the "travel distance (km)" entry from the RAM 42, and displays the result on the liquid crystal display 25. Thus, among the routes that have been traveled in the past, three cases are displayed starting from the best cases in order of the most distance reduction effect that has been obtained by updating the navigation map information 37A.

Furthermore, if the "fuel savings merit" button 64 has been pressed via the touch panel or the operating button, the CPU 41 reads the "display data" that shows the improved content of the "fuel savings (l)" entry from the RAM 42, and displays the result on the liquid crystal display 25. Thus, among the routes that have been traveled in the past, three cases are displayed starting from the best cases in order of the most distance reduction effect that has been obtained by updating the navigation map information 37A.

In addition, the CPU 41 displays a "return" button 66 that directs returning to the previous screen display. The CPU 41 also displays a "cancel" button 67 that directs the cancellation of the display of the improved content in the case in which the navigation map information 37A has been updated to the newest version of the map information. Thus, in the case in which the "return" button 66 has been pressed via the touch panel or an operating button, the CPU 41 displays the previous screen. In addition, in the case in which the "cancel" button 67 has been pressed via the touch panel or the operating button, the CPU 41 cancels the display of the content that has been improved in the case in which the navigation map information 37A has been updated.

Next, another exemplary benefit notification method will be described with reference to FIGS. 7 and 8. In the following explanation, identical reference numerals are used for structures that have already been described. The exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

For example, the method may be implemented as programs that are stored in the RAM 42 and ROM 43, which are provided in the navigation apparatus 2, and executed at predetermined time intervals (for example, from every 10 milliseconds to every 100 milliseconds) by the CPU 41.

Figure 7:
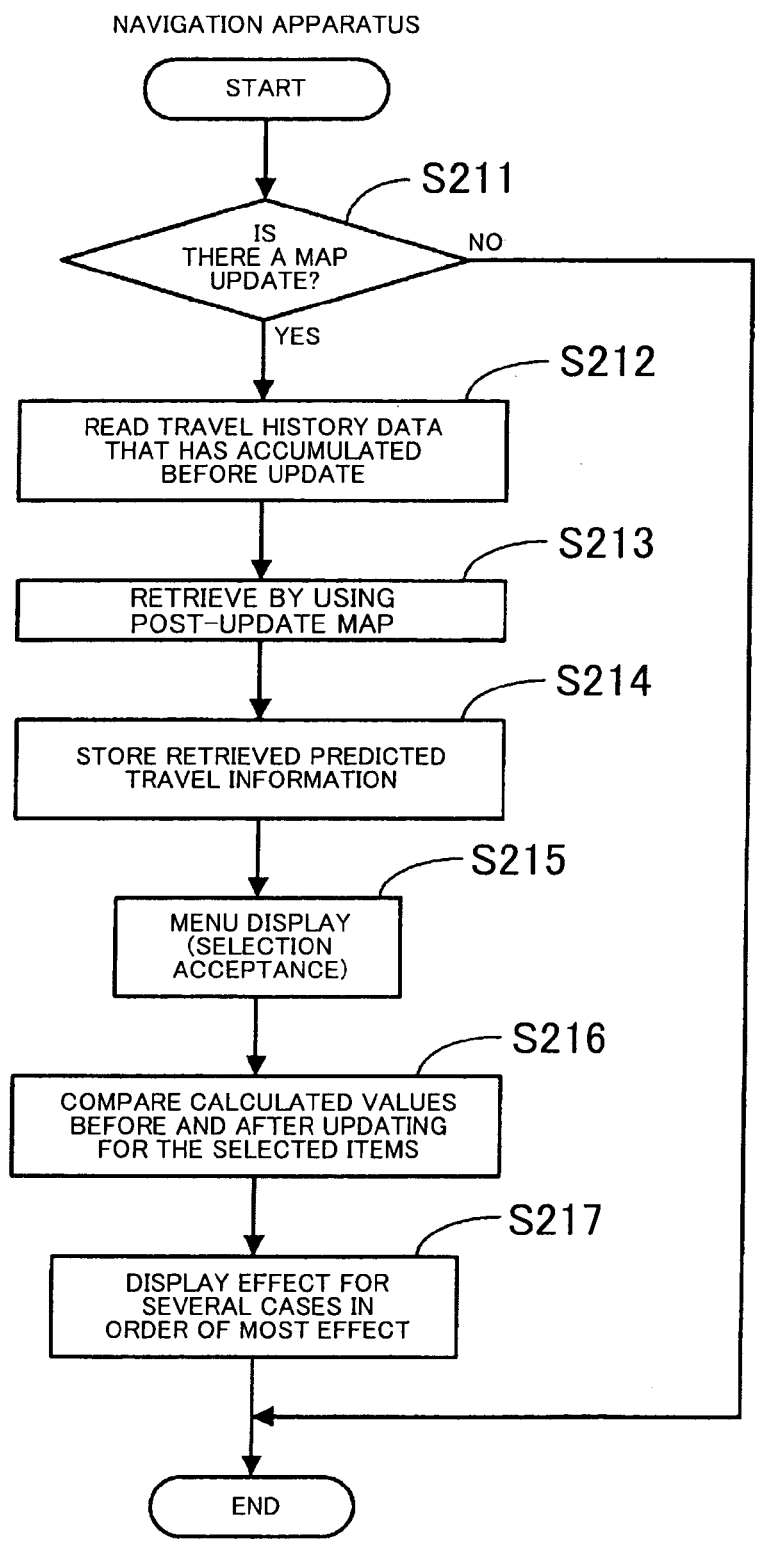
FIG. 7 is a flowchart that shows an exemplary benefit notification method.

As shown in FIG. 7, first, in S211, the CPU 41 reads a prescribed version of the map information at a prefecture unit or the like from a CD-ROM 6 that is inserted in the reading unit 28, and executes the determination processing that determines whether the navigation map information 37A has been updated. If the navigation map information 37A has not been updated (S211: NO), the CPU 41 ends this processing.

If the navigation map information 37A has been updated (S211: YES), the CPU reads each of the sets of travel history data (each of the data sets of the "date," the "departure point"→"destination point," the "required time (min)," the "travel time (km)," and the "fuel consumption (l)") that are stored in the travel history data table 51, which is contained in the travel history DB 38 (step 212), and stores the results in the RAM 42.

Note that the CPU 41 may transmit each of the sets of the travel history data from 3 months to 6 months ago to the present, which are stored in the travel history data table 51.

In addition, the CPU 41 may carry out the processing after S212 not only in the case in which the navigation map information 37A is updated by reading a prescribed version of the map information at a prefecture unit or the like from the CD-ROM 6 that has been inserted into the reading unit 28, but also in the case in which, for example, the navigation map information 37A is updated by receiving differential data for updating to the newest version of the map information from the information distribution center 3, and the case in which the navigation map information 37A is comprehensively updated at a dealer or the like.

In S213, the CPU 41 reads in sequence the "date" and the "departure point→destination point" in the travel history data from the RAM 42, and based on the day of the week of this "date," the season, and the departure time, retrieves routes that correspond to the "departure point→destination point" based on the map information of the updated navigation map information 37A, the present condition traffic information 36A, and the statistical traffic information 36B, and the like, and stores the route information related to each of these retrieved routes in the RAM 42.

Next, in S214, the CPU 41 calculates the "required time (min)," the "travel time (km)," and the "fuel consumption (l)" for each of the routes based on the route information related to each of these retrieved routes, and stores the results in the RAM 42 as the predicted travel information. Subsequently, the CPU 41 produces the travel information comparison table 52 described above (e.g., FIG. 5) based on the travel history data of the navigation apparatus 2 that are stored in the RAM 42, and each of the sets of predicted travel information that are stored in the RAM 42, and stores the results in the travel history DB 38.

Thus, based on this travel information comparison table 52, the CPU 41 can compare each of the "required time (min)," the "travel distance (km)," and the "fuel consumption (l)" entries for each of the routes that has been retrieved by using the "pre-update map information" of the navigation map information 37A that corresponds to the "date" and the "departure point→destination point" and each of the routes that have been retrieved by using the "post-update map information."

Then, in step S215, the CPU 41 displays on the liquid crystal display 25 the menu display, which accepts the display of the content that has been improved by updating the map information of the navigation map information 37A.

In S216, the CPU 41 compares each of the sets of data that correspond to the entries that have been selected in the "post-update map retrieval" and the "pre-update map retrieval" of the travel information comparison table 52. In addition, the CPU 41 selects several cases (for example, three to five cases) starting from the best cases in order of most improved effect before and after the updating of the navigation map information 37A, and stores the results in the RAM 42.

For example, for the "required time (min)" of the "post-update map retrieval" and the "pre-update map retrieval" in the travel map comparison table 52, in the case in which the "date" is 2007/XX/YY/ZZ:ZZ and the "departure point→destination point" is "C→D," the CPU 41 stores the case for a "30 minute reduction" in the RAM 42 as the best case for time reduction. Further, in the case in which the "date" is 2007/1/1/10:30 and the "departure point→destination point" is "A→B," the CPU 41 stores the case for a "20 minute reduction" in the RAM 42 as the second best case for time reduction. Furthermore, in the case in which the "date" is 2007/XX/YY/ZZ:ZZ and the "departure point→destination point" is "A→F," the CPU 41 stores the case for a "15 minute reduction" in the RAM 42 as the third best case for time reduction.

In S217, the CPU 41 reads several cases that are best cases in order of most improved effect that correspond to these selected entries from the RAM 42, and after displaying the results on the liquid crystal display 25, ends this processing. In addition, in contrast, in the case in which the cancellation of the menu display has been directed via the operation unit 24, the CPU 41 ends this processing.

An example of the menu display that is displayed by the CPU 41 on the liquid crystal display 25 and of the effect display of the selected entries will be explained with reference to FIG. 8. As shown in FIG. 8, first, the CPU 41 reads the version information of the updated map information from the navigation map information 37A, and displays "map update complete for version xx" on the liquid crystal display 25. In addition, the CPU 41 displays a "newest function merit" button 70, which directs the display of the content that has been improved by updating the map information of the navigation map information 37A. In addition, the CPU 41 displays an "OK" button 71, which directs the cancellation of the display of the content that has been improved by updating the map information of the navigation map information 37A.

Figure 8:
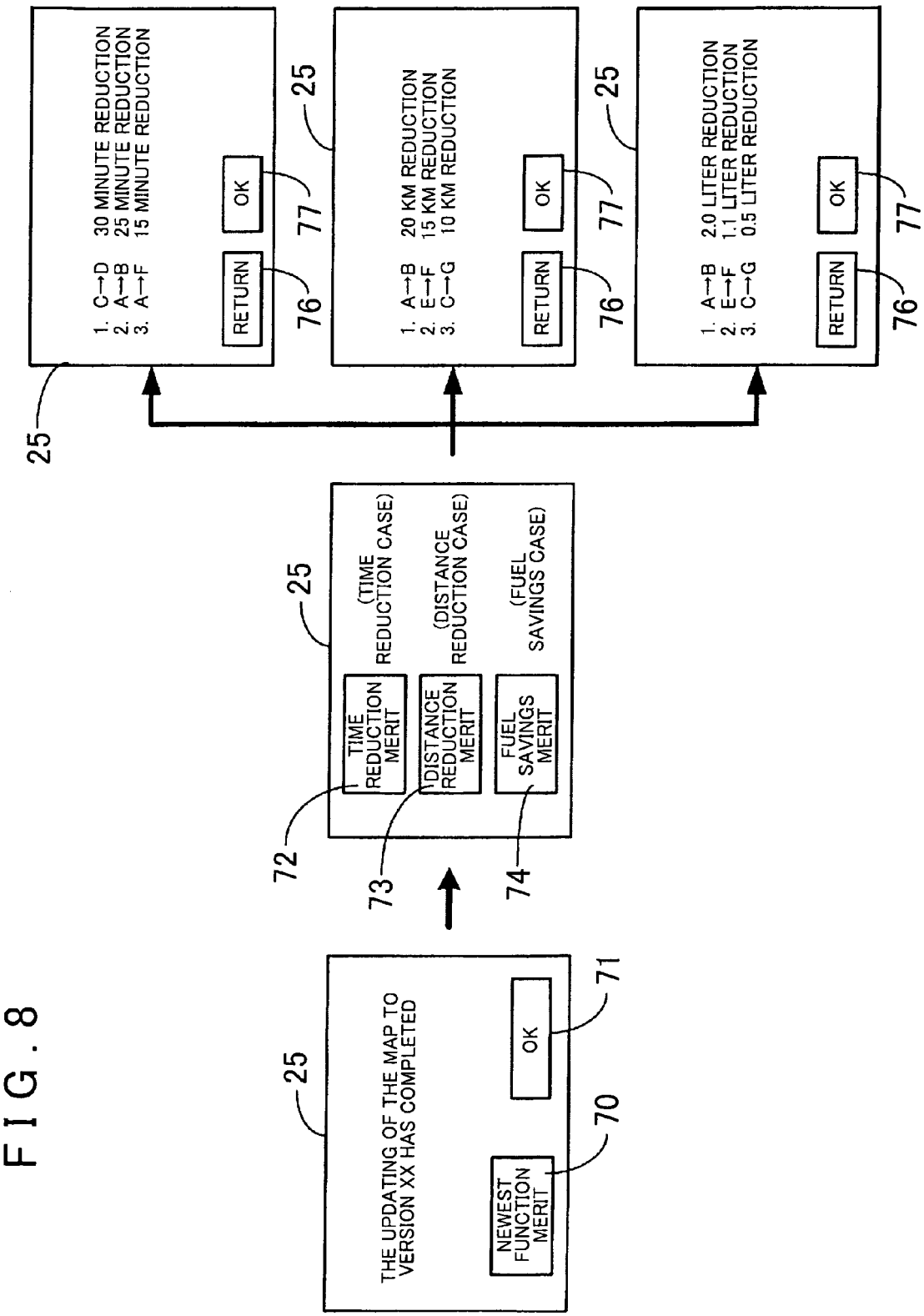
FIG. 8 is a diagram that shows examples of a menu display and an effect display.

In addition, as shown in FIG. 8, in the case in which the "newest function merit" button 70 has been pressed via the touch panel or the operation button, the CPU 41 arranges vertically and displays, on the liquid crystal display 25, a "time reduction merit" button 72, which directs the display of the improved content of the "required time (min)" entry, a "distance reduction merit" button 73, which directs the display of the "display data" that shows the improved content of the "travel distance (km)" entry, and a "fuel savings merit" button 74, which directs the display of the "display data" that shows the improved content of the "fuel consumption (l)" entry. In addition, the CPU 41 displays "time reduction case," "distance reduction case," and "fuel savings case."

When the "OK" button 71 has been pressed via the touch panel or the operation button, the CPU 41 cancels the display of the content that has been improved by the updating of the navigation map information 37A.

Next, as shown in FIG. 8, when the "time reduction merit" button 72 has been pressed via the touch panel or the operation button, the CPU 41 compares the sets of data corresponding to the "required time (min)" entry of the "post-update map retrieval" and the "pre-update map retrieval" in the travel information comparison table 52. Next, the CPU 41 selects, for example, three cases starting from the best case in order of most improved effect before and after updating the navigation map information 37A, and displays the results on the liquid crystal display 25. Thus, among the routes that have been traveled in the past, three cases are displayed starting from the best case in order of the most time reduction effect that is due to the updating of the navigation map information 37A is displayed.

In addition, as shown in FIG. 8, in the case in which the "distance reduction merit" button 73 has been pressed via the touch panel or the operation button, the CPU 41 compares the sets of data corresponding to the "travel distance (km)" entry of the "post-update map retrieval" and the "pre-update map retrieval" in the travel information comparison table 52. Next, the CPU 41 selects, for example, three cases starting from the best case in order of most improved effect before and after updating the navigation map information 37A, and displays the results on the liquid crystal display 25. Thus, among the routes that have been traveled in the past, three cases are displayed starting from the best case in order of the most distance reduction effect that is due to the updating of the navigation map information 37A is displayed.

Furthermore, as shown FIG. 8, in the case in which the "fuel savings merit" button 74 has been pressed via the touch panel or the operation button, the CPU 41 compares the sets of data corresponding to the "fuel consumption (l)" entry of the "post-update map retrieval" and the "pre-update map retrieval" in the travel information comparison table 52. Next, the CPU 41 selects, for example, three cases starting from the best case in order of the most improved effect before and after updating the navigation map information 37A, and displays the results on the liquid crystal display 25. Thus, among the routes that have been traveled in the past, three cases are displayed starting from the best case in order of the most fuel savings effect that is due to the updating of the navigation map information 37A is displayed.

The CPU 41 displays a "return" button 76 on the liquid crystal display 25, which directs returning to the previous screen display. In addition, the CPU 41 displays an "OK" button 77, which directs the cancellation of the display of the content that has been improved by the updating of the navigation map information 37A. Thus, in the case in which the "return" button 76 has been pressed via the touch panel or the operation button, the CPU carries out the display of the previous screen display. In addition, in the case in which the "OK" button 77 has been pressed via the touch panel or the operation button, the CPU 41 cancels the display of the content that has been improved by the updating of the navigation map information 37A.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in S116 described above, the CPU 11 produces display data that shows the improved values having the greatest improved effect for each of the "required time (min)," the "travel distance (km)," and the "fuel consumption (l)" entries, and stores the display data in the RAM 12. Subsequently, the CPU 11 may read the navigation apparatus identification ID that corresponds to the travel history data that has been received from the travel history DB 18, may read the "display data" from the RAM 12, and may transmit the "display data" along with the newest version of the version data of the update map information 14A to the navigation apparatus 2 that corresponds to the navigation apparatus identification ID.

In addition, in S15, in the case in which the CPU 41 has been directed to display the improved content via a menu display that is displayed on the liquid crystal display 25 via the operation unit 24, the CPU 41 may read the "display data" that shows the improved values having the highest improvement effect for each of the "required time (min)," the "travel distance (km)," and the "fuel consumption (l)" entry, and display the results on the liquid crystal display 25.

Thus, for the route that will actually be used, the user can recognize the route having the greatest improved values due to the map update, and can easily recognize the benefits for the case in which the navigation map information 37A has been updated.

Figure 9:
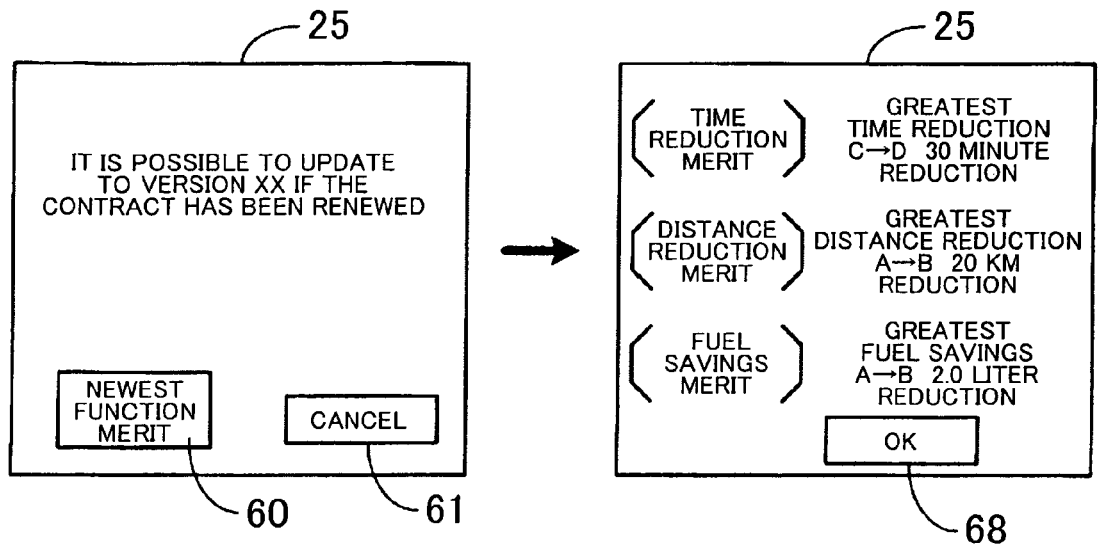
FIG. 9 is a diagram that shows examples of a menu display and an effect display.

Another example of the menu display that the CPU 41 may display on the liquid crystal display 25 and the effect display of the selected entries will be explained with reference to FIG. 9. As shown in FIG. 9, first, the CPU 41 reads the newest version of the version information (for example, the newest version is "version xx") of the update map information 14A from the RAM 42, and displays "it is possible to update to version xx if the contract has been renewed" on the liquid crystal display 25. In addition, the CPU 41 displays the "newest function merit" button 60, which directs the display of the improved content in the case in which the navigation map information 37A has been updated to the newest version of the map information, on the liquid crystal display 25. In addition, the CPU 41 displays the "cancel" button 61, which directs the cancellation of the display of the improved content in the case in which the navigation map information 37A has been updated.

As shown in FIG. 9, in the case in which the "newest function merit" button 60 has been pressed via the touch panel or the operation button, the CPU 41 displays on the liquid crystal display 25 the most improved "time reduction merit" of the "required time (min)" entry, the most improved "distance reduction merit" of the "travel distance (km)" entry, and the most improved "fuel savings merit" of the "fuel consumption (l)" entry. In addition, the CPU 41 displays an "OK" button 68, which directs the cancellation of the display of the improved content in the case in which the navigation map information 37A has been updated, on the liquid crystal display 25.

In addition, for example, in S216 to S217 described above, in the case in which the CPU 41 has been directed to display the improved content via the menu display that is displayed on the liquid crystal display 25 via the operation unit 24, for each of the "required time (min)," the "travel distance (km)," and the "fuel consumption (l)" entries, the CPU 41 may select the entries that have the improved values with the greatest improvement effect before and after the updating of the navigation map information 37A, and display these on the liquid crystal display 25.

Thus, for the route that will actually be used, the user can recognize the route having the greatest improved value among the improvement values that have been obtained due to the updating of the navigation map information 37A, and can easily recognize the benefits of the improved navigation map information 37A.

Figure 10:
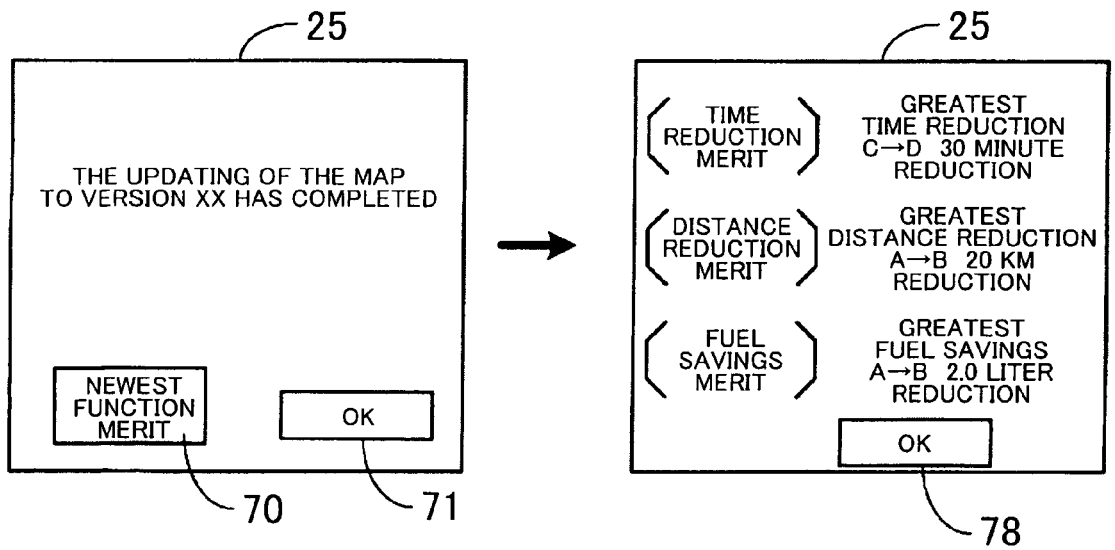
FIG. 10 is a diagram that shows examples of a menu display and an effect display.

Another example of the menu display that the CPU 41 displays on the liquid crystal display 25 and the effect display of the selected entry will be explained with reference to FIG. 10. As shown in FIG. 10, first the CPU 41 reads the version information of the updated map information from the navigation map information 37A, and displays "the updating of the map to version xx has completed" on the liquid crystal display 25. Then, the CPU 41 displays the "newest function merit" button 70, which directs the display of the content that has been improved by updating the map information of the navigation map information 37A, on the liquid crystal display 25. In addition, the CPU 41 displays the "OK" button 71, which directs the cancellation of the display of the content that has been improved by updating the map information of the navigation map information 37A.

In addition, as shown in FIG. 10, in the case in which the "newest function merit" button 70 has been pressed via the touch panel or the operation button, the CPU 41 displays on the liquid crystal display 25 the most improved "time reduction merit" for the "required time (min)" entry, the "distance reduction merit" for the most improved "travel distance (km)" entry, and the most improved "fuel savings merit" for the "fuel consumption (I)" entry. In addition, the CPU 41 displays an "OK" button 78, which directs the cancellation of the display of the content that has been improved by the updating of the navigation map information 37A on the lower edge portion of the liquid crystal display 25.

In addition, in the processing in S113 described above, the "date" and the "departure point→destination point" may be read in sequence in the travel history data that is stored in the travel history data table 51, routes that are frequently traveled (for example, routes that have been traveled 5 times or more) may be retrieved based on the newest version of the map information that is contained in the update map information 14A, the present condition travel information 16A, the statistical travel information 16B and the like, and the route information related to each of the retrieved routes may be obtained.

In addition, in S213 described above, the "date" and the "departure point→destination point" may be read in sequence in the travel history data that has been stored in the RAM 42, routes that are frequently traveled (for example, routes that have been traveled 5 times or more) may be retrieved based on the map information of the updated navigation map information 37A, the present condition traffic information 36A, the statistical travel information 36B and the like, and the route information related to each of the retrieved routes may be obtained.

Thus, for routes that are frequently used, the user can easily recognize the benefits that are obtained by the updating of the navigation map information 37A and the benefits that are obtained by the updated navigation map information 37A.

In addition, as described above, the CPU 41 of the navigation apparatus 2 may send the travel history data that has been contained in the travel history DB 38 along with the navigation apparatus identification ID to the information distribution center 3 when a destination point is reached, every 24 hours, every week or the like, not just when an update request command that directs the updating of the navigation map information 37A has been input. In contrast, the CPU 11 of the information distribution center 3 may contain the travel history data and the navigation apparatus identification ID that have been received in sequence in the travel history DB 18 classified by navigation apparatus identification ID.

Thus, in step 12 described above, the CPU 41 can reduce the amount of data that is transmitted to the information distribution center 3.

What is claimed is:

1. A map information distribution center for use in a map information updating system to update map information stored in a navigation apparatus, the map information distribution center comprising:
   a memory that stores:
      a travel history in which at least one of required time, travel distance and fuel consumption of a route associated with each of a plurality of combinations of departure points and destination points of routes set in the past in the navigation apparatus and received from the navigation apparatus;
      a newest version of the map information; and
   a controller that:
      for each of the combinations of departure points and destination points of the travel history, compares between 1) the required time, the travel distance, and the fuel consumption of a route calculated in the information distribution center using the newest version of the map information and 2) the required time, the travel distance, and the fuel consumption of the travel history; and
      before updating the map information stored in the navigation apparatus, transmits a message to the navigation apparatus explaining benefits that can be obtained by updating the map information stored in the navigation apparatus with the newest version of the map data, the message being generated based on the comparison results and indicating the benefit that can be obtained by updating the map information by indicating:
         a departure point and a destination point from among the plurality of the combinations of the departure points and the destination points having a greatest required time reduction as a result of updating the map information;
         a departure point and a destination point from among the plurality of the combinations of the departure points and the destination points having a greatest travel distance reduction as a result of updating the map information; and
         a departure point and a destination point from among the plurality of the combinations of the departure points and the destination points having a greatest fuel consumption reduction as a result of updating the map information; and
      displays the message in such a manner that a user of the navigation apparatus can understand the overall benefit of updating the map information stored in the navigation apparatus with the newest version of the map data.

2. The map information distribution center according to claim 1, wherein the controller:

based on the comparison between the route and the travel history, calculates values that will be improved by using the routes retrieved using the newest version of the map information instead of the routes retrieved using the map information stored in the navigation apparatus.

3. The map information distribution center according to claim 2, wherein the controller transmits the message based on the comparison results for the routes having the most improved values.

4. The map information distribution center according to claim 2, wherein the calculated values comprise at least one of:
required travel time;
required travel distance; and
fuel consumption.

5. The map information distribution center according to claim 1, wherein the controller:
determines whether an update request has been received from the navigation apparatus; and
transmits the message when the update request has been received.

6. The map information distribution center according to claim 1, further comprising a communication apparatus that receives, from the navigation apparatus, information including at least one of:
a version of the map data stored in the navigation apparatus;
an ID of the navigation apparatus; and
travel history data including the plurality of combinations of departure points and destination points that have been set in the past.

7. A map information updating method that updates map information stored in a navigation apparatus, the method comprising:
storing, in the navigation apparatus, travel history in which at least one of required time, travel distance and fuel consumption of a route associated with each of a plurality of combinations of departure points and destination points of routes set in the past in the navigation apparatus;
transmitting the travel history from the navigation apparatus to the map information distribution center;
storing the travel history received from the navigation apparatus;
accessing a newest version of the map information stored in the memory in the map information distribution center;
comparing, for each of the combinations of departure points and destination points of the travel history, between 1) the required time, the travel distance, and the fuel consumption of a route calculated in the information distribution center using the newest version of the map information and 2) the required time, the travel distance, and the fuel consumption of the travel history; and
before updating the map information stored in the navigation apparatus, transmitting a message to the navigation apparatus explaining benefits that can be obtained by updating the map information stored in the navigation apparatus with the newest version of the map data, the message being generated based on the comparison results and indicating the benefit that can be obtained by updating the map information by indicating at least one of:
a departure point and a destination point from among the plurality of the combinations of the departure points and the destination points having a greatest required time reduction as a result of updating the map information;
a departure point and a destination point from among the plurality of the combinations of the departure points and the destination points having a greatest travel distance reduction as a result of updating the map information; and
a departure point and a destination point from among the plurality of the combinations of the departure points and the destination points having a greatest fuel consumption reduction as a result of updating the map information; and
displaying the message in such a manner that a user of the navigation apparatus can understand the overall benefit of updating the map information stored in the navigation apparatus with the newest version of the map data.

8. The map information updating method according to claim 7, further comprising:
calculating, based on the comparison between the route and the travel history, values that will be improved by using the routes retrieved using the newest version of the map information instead of the routes retrieved using the map information stored in the navigation apparatus.

9. The map information updating method according to claim 8, further comprising transmitting the message based on the comparison results for the routes having the most improved values.

10. The map information updating method according to claim 8, wherein the calculated values comprise at least one of:
required travel time;
required travel distance; and
fuel consumption.

11. The map information updating method according to claim 7, further comprising:
determining whether an update request has been received from the navigation apparatus; and
transmitting the message when the update request has been received.

12. The map information updating method according to claim 7, further comprising receiving, from the navigation apparatus, information including at least one of:
a version of the map data stored in the navigation apparatus;
an ID of the navigation apparatus; and
travel history data including the plurality of combinations of departure points and destination points that have been set in the past.

13. A non-transitory computer-readable storage medium storing a computer-executable program usable to update map information stored in a navigation apparatus, the program comprising:
instructions for storing, in the navigation apparatus, travel history in which at least one of required time, travel distance and fuel consumption of a route associated with each of a plurality of combinations of departure points and destination points of routes set in the past in the navigation apparatus;
instructions for transmitting the travel history from the navigation apparatus to the map information distribution center;
instructions for storing the travel history received from the navigation apparatus;
instructions for accessing a newest version of the map information stored in the memory in the map information distribution center;

instructions for comparing, for each of the combinations of departure points and destination points of the travel history, between 1) the required time, the travel distance, and the fuel consumption of a route calculated in the information distribution center using the newest version of the map information and 2) the required time, the travel distance, and the fuel consumption of the travel history; and instructions for, before updating the map information stored in the navigation apparatus, transmitting a message to the navigation apparatus explaining benefits that can be obtained by updating the map information stored in the navigation apparatus with the newest version of the map data, the message being generated based on the comparison results and indicating the benefit that can be obtained by updating the map information by indicating:

a departure point and a destination point from among the plurality of the combinations of the departure points and the destination points having a greatest required time reduction as a result of updating the map information;

a departure point and a destination point from among the plurality of the combinations of the departure points and the destination points having a greatest travel distance reduction as a result of updating the map information; and a departure point and a destination point from among the plurality of the combinations of the departure points and the destination points having a greatest fuel consumption reduction as a result of updating the map information; and instructions for displaying the message in such a manner that a user of the navigation apparatus can understand the overall benefit of updating the map information stored in the navigation apparatus with the newest version of the map data.

* * * * *